US007159236B2

(12) United States Patent
Abe et al.

(10) Patent No.: US 7,159,236 B2
(45) Date of Patent: Jan. 2, 2007

(54) TRANSMISSION/RECEPTION INTEGRATED RADIO-FREQUENCY APPARATUS

(75) Inventors: Shuji Abe, Kumagaya (JP); Katsuya Kudo, Fukaya (JP); Masami Oosawa, Kumagaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1061 days.

(21) Appl. No.: 09/793,982

(22) Filed: Feb. 28, 2001

(65) Prior Publication Data

US 2002/0056134 A1 May 9, 2002

(30) Foreign Application Priority Data

Jun. 30, 2000 (JP) ............................. 2000-198475

(51) Int. Cl.
*H04N 7/173* (2006.01)
*H04N 7/16* (2006.01)
*H04B 1/04* (2006.01)
*H04L 5/16* (2006.01)

(52) U.S. Cl. ........................ 725/111; 725/131; 725/151; 375/222; 455/127.1; 455/127.2

(58) Field of Classification Search ................ 725/111, 725/131, 151, 125, 139; 367/43; 375/222; 455/127.1, 127.2, 299, 339, 114.2, 75
See application file for complete search history.

(56) References Cited

U.S. PATENT DOCUMENTS

| | | | |
|---|---|---|---|
| 4,677,037 A | | 6/1987 | Takabayashi |
| 4,758,920 A | * | 7/1988 | McCartney ................. 361/119 |
| 4,962,462 A | | 10/1990 | Fekete |
| 4,968,566 A | | 11/1990 | Lersch et al. |
| 5,631,797 A | * | 5/1997 | Chabinec et al. .......... 361/91.5 |
| 5,780,980 A | | 7/1998 | Naito |
| 5,916,699 A | | 6/1999 | Thomas et al. |
| 5,964,309 A | | 10/1999 | Kimura et al. |
| 5,970,055 A | | 10/1999 | Park et al. |
| 6,169,569 B1 | * | 1/2001 | Widmer et al. ............. 725/111 |
| 6,188,764 B1 | * | 2/2001 | Huang et al. ............... 379/412 |
| 6,326,097 B1 | | 12/2001 | Hockaday |
| 6,662,135 B1 | * | 12/2003 | Burns et al. ................ 702/120 |
| 6,757,910 B1 | * | 6/2004 | Bianu ......................... 725/125 |

FOREIGN PATENT DOCUMENTS

| | | |
|---|---|---|
| EP | 0911962 A1 | 4/1999 |
| EP | 1 091 437 A1 | 4/2001 |

(Continued)

OTHER PUBLICATIONS

Jaesung Han et al., "Direct methanol fuel-cell combined with a small back-up battery," Journal of Power Sources 112, Elsevier Science B.V., p. 477-483, (Aug. 3, 2002).

(Continued)

*Primary Examiner*—Chris Kelley
*Assistant Examiner*—Joseph G. Ustaris
(74) *Attorney, Agent, or Firm*—Pillsbury Winthrop Shaw Pittman, LLP

(57) ABSTRACT

There is provided a highly reliable transmission/reception integrated radio-frequency apparatus which can achieve a high communication quality in a cable modem. A reception RF signal is input to a reception system block via an input/output terminal, converted to an intermediate-frequency signal, and output from a terminal. An output terminal of a transmission processing section of a transmission system block is connected to the input/output terminal via an overvoltage protection circuit, a high-pass filter functioning as a countermeasure to overvoltage, and a low-pass filter for suppressing harmonics produced from the high-pass filter.

3 Claims, 8 Drawing Sheets

FOREIGN PATENT DOCUMENTS

| | | |
|---|---|---|
| EP | 1 233 468 A2 | 8/2002 |
| GB | 1131171 | 10/1968 |
| GB | 1 304 092 | 1/1973 |
| JP | 60-59640 U | 4/1985 |
| JP | 63-171030 | 7/1988 |
| JP | 3-224295 | 10/1991 |
| JP | 03-248634 | 11/1991 |
| JP | 06-38379 | 5/1994 |
| JP | 06-139916 | 5/1994 |
| JP | 06-284024 | 10/1994 |
| JP | 07-030475 | 1/1995 |
| JP | 8-32267 | 2/1996 |
| JP | 09-036777 | 2/1997 |
| JP | 09-046264 | 2/1997 |
| JP | 10-75082 | 3/1998 |
| JP | 11-027168 | 1/1999 |
| JP | 11-103427 | 4/1999 |
| JP | 11-154804 | 6/1999 |
| JP | 11-186933 | 7/1999 |
| JP | 2000-134128 | 5/2000 |
| JP | 2002-16524 | 1/2002 |
| JP | 2002-63920 A | 2/2002 |
| JP | 2002-198077 A | 7/2002 |
| WO | WO 98/56058 | 12/1998 |
| WO | WO 99/57930 | 11/1999 |
| WO | WO 01/79012 A2 | 10/2001 |
| WO | WO 2004/031929 A1 | 4/2004 |
| WO | WO 2004/032269 A2 | 4/2004 |

OTHER PUBLICATIONS

U.S. Appl. No. 10/848,064, filed May 19, 2004, inventor Shuji Abe.
U.S. Appl. No. 10/860,788, filed Jun. 4, 2004, inventor Shuji Abe.
U.S. Appl. No. 10/826,910, filed Apr. 19, 2004, inventor Shuji Abe.
Japanese Office Action dated Jun. 6, 2006 for U.S. Appl. No. 2000-198475.

* cited by examiner

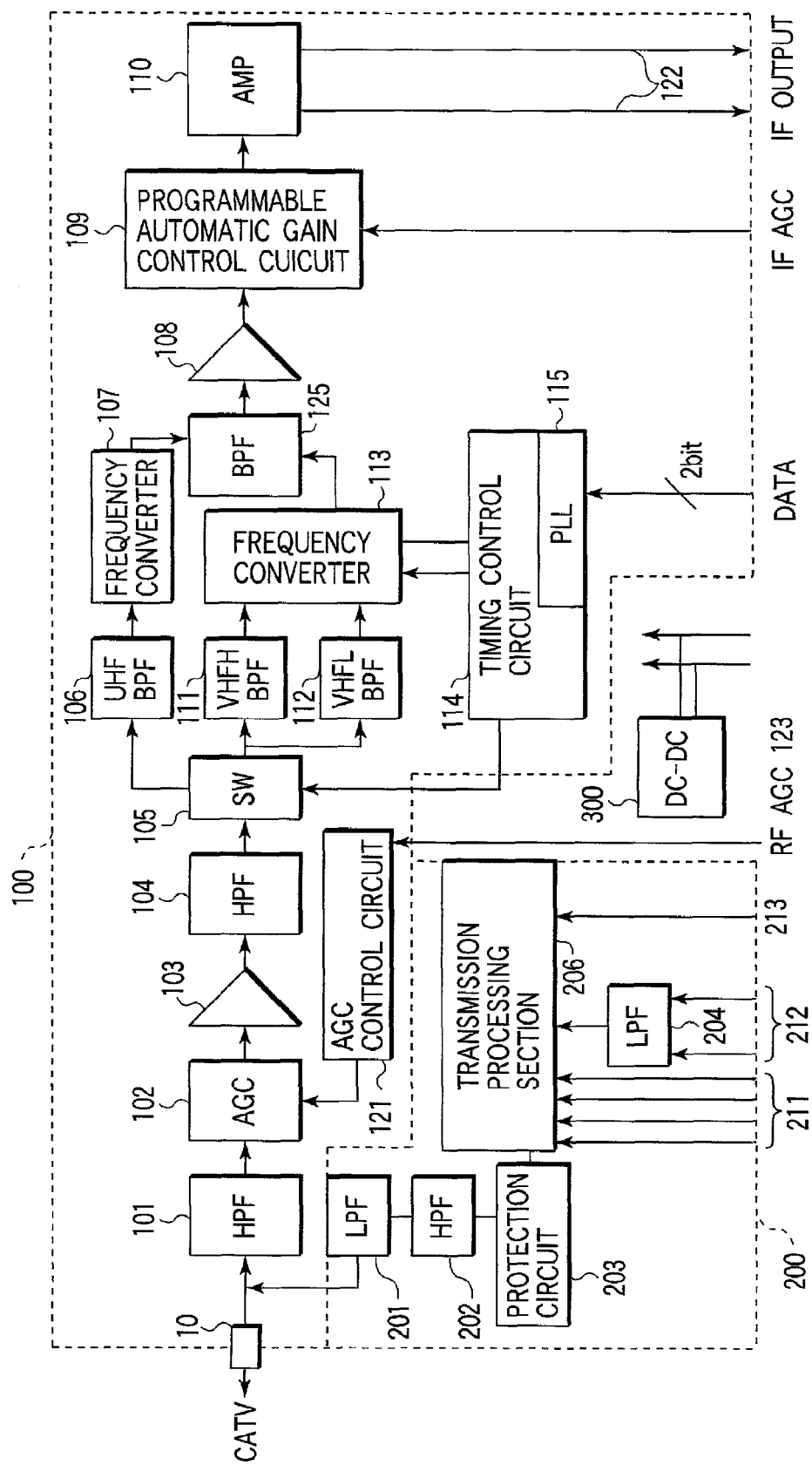
F I G. 1

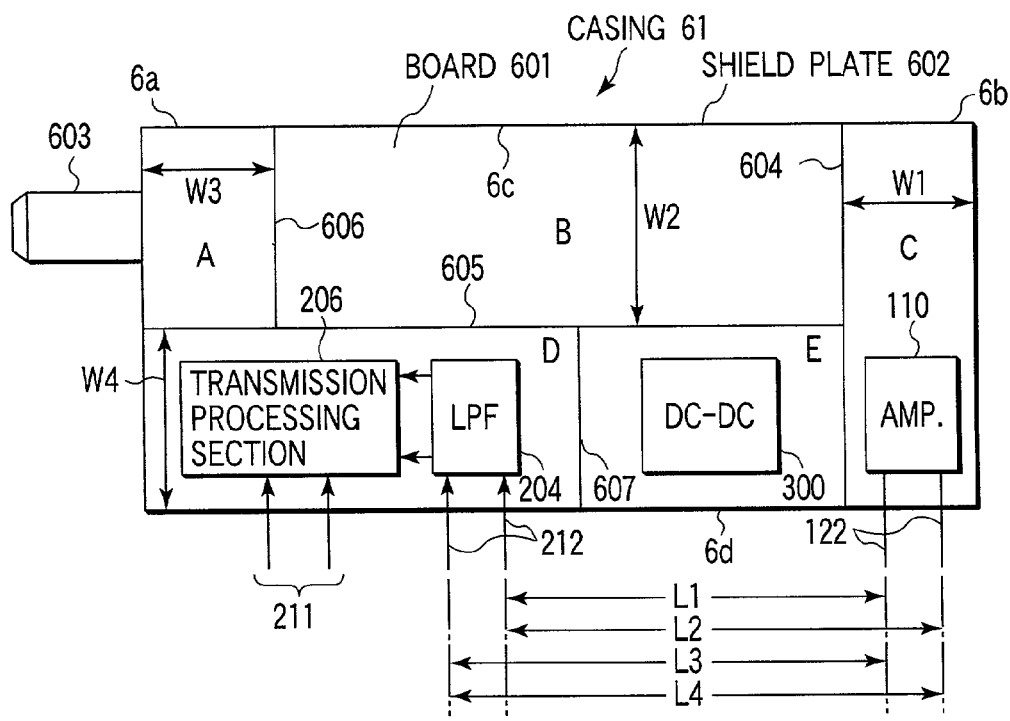
F I G. 6
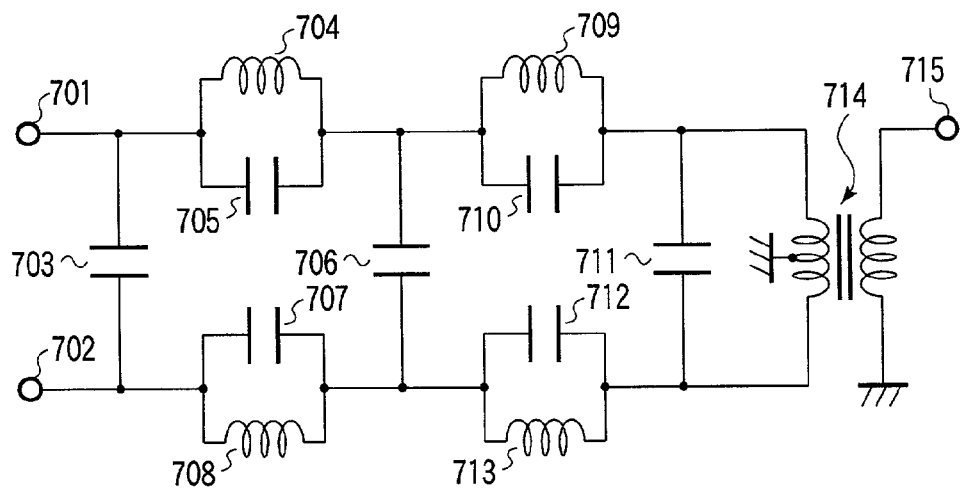
F I G. 7

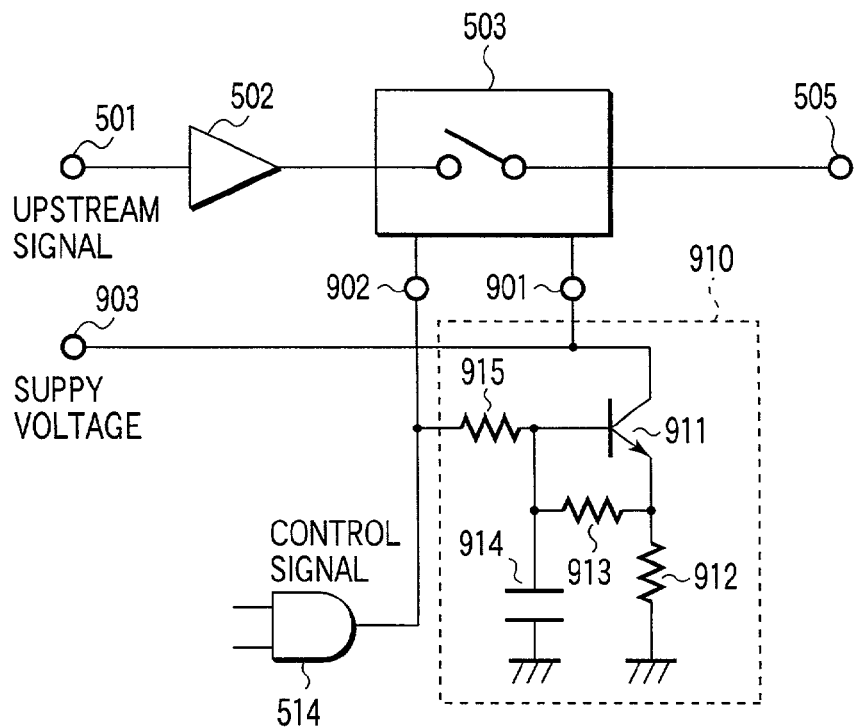
F I G. 9A
| TERMINAL 902 | LOW LEVEL | HIGH LEVEL |
|---|---|---|
| 503 CONSUMED CURRENT | $I_{SH}+I_\alpha$ (mA) | $I_{SH}$ (mA) |
| 910 CONSUMED CURRENT | $I_{CL}$ (mA) | $I_{CL}+I_\beta$ (mA) |
| CURRENT VARIATION AS VIEWED FROM 903 | $I_{SH}+I_{CL}+I_\alpha$ (mA) | $I_{SH}+I_{CL}+I_\beta$ (mA) |
F I G. 9B

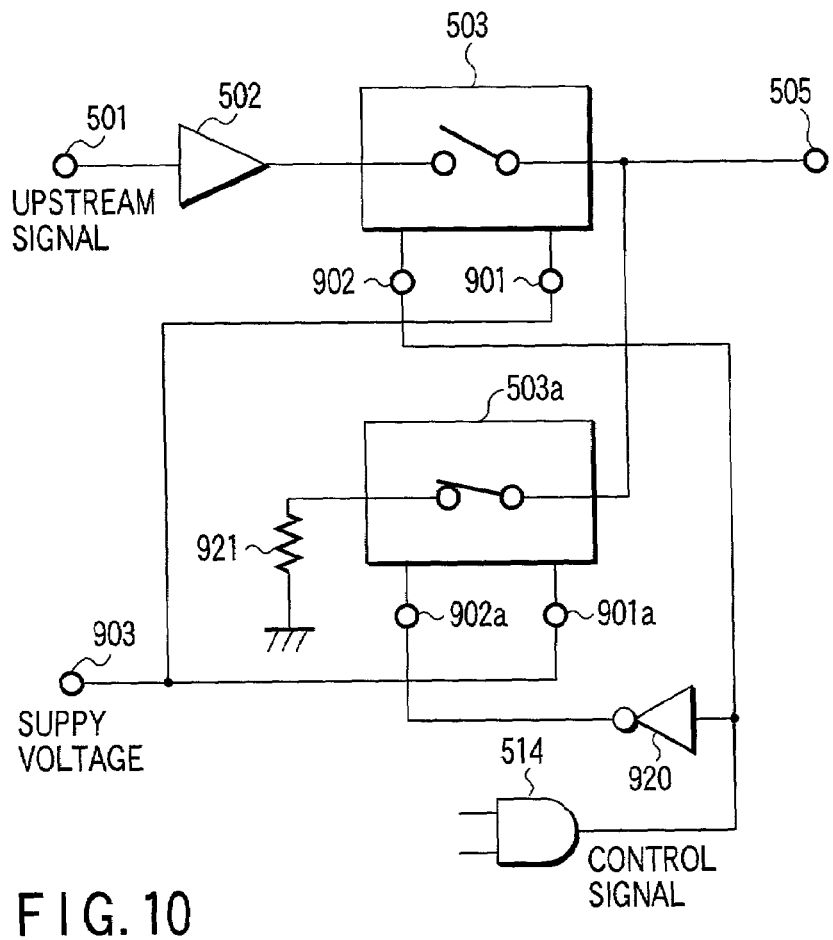
F I G. 10
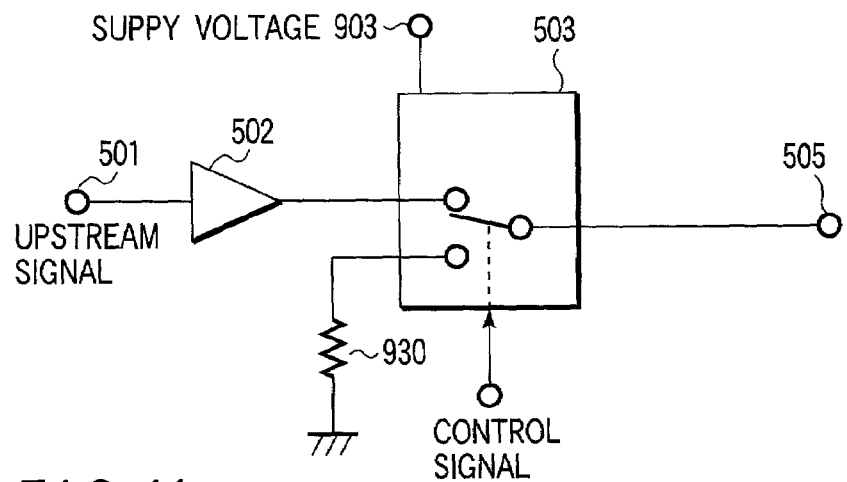
F I G. 11

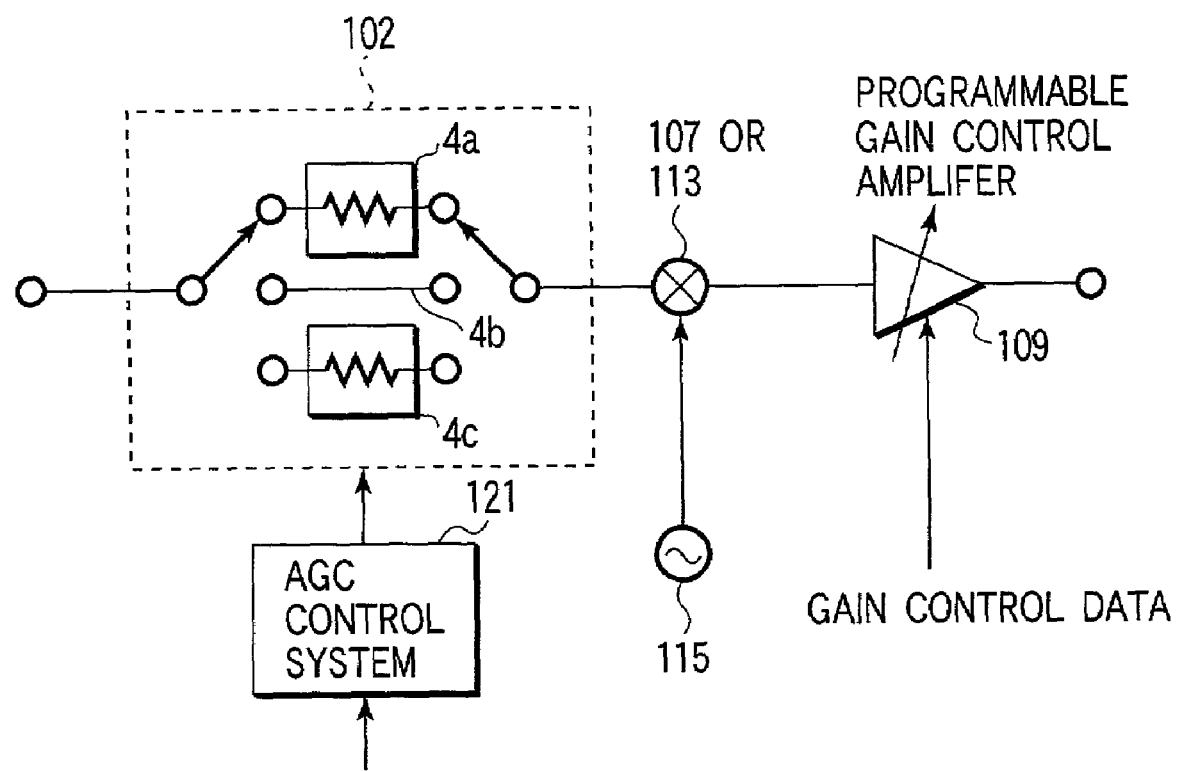
F I G. 12

TRANSMISSION/RECEPTION INTEGRATED RADIO-FREQUENCY APPARATUS

CROSS-REFERENCE TO RELATED APPLICATIONS

This application is based upon and claims the benefit of priority from the prior Japanese Patent Application No. 2000-198475, filed Jun. 30, 2000, the entire contents of which are incorporated herein by reference.

BACKGROUND OF THE INVENTION

The present invention relates to a transmission/reception integrated radio-frequency (RF) apparatus used on a terminal side connected to, e.g. a two-way cable television (CATV) network.

With recent development in multi-media technology and digital technology in the fields of broadcasting and communications, amalgamation of broadcasting and communications technologies will shortly be realized. For example, a CATV line, which has a higher data transmission capacity than a telephone line, may be utilized to constitute a network, over which data communication services can be provided. In this case, a communication device (e.g. a personal computer), serving as a subscriber terminal, is connected to the CATV network. The personal computer, for instance, accesses a server via the CATV network and the Internet.

In this system, a unit called a cable modem, which functions as an interface with the CATV line, is disposed in the subscriber's house, and the user connects the cable modem to his/her PC. Thereby, the user can access an external network, such as the Internet, via a CATV broadcasting center. An example of a tuner of the cable modem described in Jpn. Pat. Appln. KOKAI Publication No. 11-103427, published Apr. 13, 1999.

In the CATV broadcasting, the center station sends broadcasting signals to each subscriber's house, using RF signals (downstream signals) of normally 90 MHz to 860 MHz. The receiving terminal, on the other hand, frequency-converts the RF signals once to three times to intermediate frequencies by means of a tuner in the cable modem, following which the intermediate frequencies are digitally demodulated. In addition, the receiving terminal can send information digitally demodulated by QPSK (Quadrature Phase Shift Keying) or 16 QAM (Quadrature Amplitude Modulation) from the individual terminal side to the center station, using RF signals (upstream signals) of normally 5 MHz to 65 MHz.

The level of the downstream signal is weak, and normally −15 to +15 dBmV, at the input terminal of the cable modem, while the level of the upstream signal is normally +8 to +58 dBmV at the output terminal of the cable modem.

The upstream signal output terminal of the cable modem is connected to an outdoor line via a coaxial cable. If overvoltage is applied due to indirect lightning stroke, semiconductor devices in the cable modem may be destroyed. As a method for preventing destruction due to overvoltage at the RF signal line, it is known to provide a protection circuit using a high-pass filter or a diode. However, the output level of the signal transmission circuit is high, and +58 dBmV at maximum. Consequently, a harmonic component (a second or third harmonic) may be produced by the protection circuit.

The upstream signal is controlled so as not to temporally overlap an upstream signal from some other user. For this purpose, a transmission time zone is assigned to the upstream signal transmission circuit, and the upstream signal transmission circuit is controlled and set in the non-operative state at time zones other than the assigned transmission time zone. If the upstream transmission circuit continues to send noise at a time zone other than the assigned one, the noise will be superimposed on the other user's upstream signal to which this time zone is assigned, and the center station cannot receive a correct signal.

An upstream signal and a downstream signal share a single coaxial cable. The upstream signal and downstream signal are thus frequency-separated by a diplexer built in the tuner of the cable modem. In the diplexer, it is needed isolation, to be ensured to prevent interference, between the upstream signal and downstream signal.

In addition, if the components of the cable modem are further reduced in size and the integration density of the IC is enhanced, it is also necessary to ensure isolation between the intermediate frequency of the downstream signal and the upstream signal.

Moreover, the cable modem simultaneously transmits the upstream signal and receives the downstream signal. Thus, the cable modem needs to be designed to stably receive the downstream signal both at the time of outputting and at the time of not outputting the upstream signal.

In the design of the cable modem, as described above, attention should be paid to the following problems.

(1) Since the level of the upstream signal is high, a harmonic component produced by the overvoltage protection circuit may interfere with the weak downstream signal. For example, when an upstream signal of 40 MHz is being transmitted, a third harmonic (120 MHz) of 40 MHz may interfere with a downstream signal of 120 MHz.

(2) If a certain user's cable modem continues to be in the active state over the assigned transmission time zone, noise may be sent to the cable and the center station may fail to exactly receive an upstream signal from some other user's cable modem.

(3) Where a circuit for transmitting an upstream signal (transmission signal) and a circuit for processing a downstream intermediate-frequency signal are integrated in an LSI for the purpose of reduction in size of circuit components, the upstream transmission signal may interfere with the downstream intermediate-frequency signal on a connection line between each circuit and an RF processing section.

(4) The upstream signal transmission circuit is activated/deactivated between the transmission time zone and the non-transmission time zone. With the activation/deactivation, a circuit current in the upstream signal transmission circuit may vary and a ripple may occur in the power supply voltage of a local oscillator which frequency-converts the downstream signal. If a ripple occurs in the power supply voltage of the local oscillator, side-band spuriousness may be caused and the quality of reception of the downstream signal may deteriorate.

BRIEF SUMMARY OF THE INVENTION

The present invention has been made in consideration of the above circumstances, and an object of the invention is to provide a highly reliable transmission/reception integrated radio-frequency (RF) apparatus which can achieve a high communication quality in a cable modem, etc.

Another object of the invention is to provide a transmission/reception integrated RF apparatus which can prevent a harmonic component produced, from an overvoltage protection circuit, from adversely affecting a downstream signal.

Still another object of the invention is to provide a transmission/reception integrated RF apparatus which can prevent transmission of noise to a general line, even if an upstream signal transmission circuit abnormally operates and continues transmission over an assigned time zone, and can prevent noise from interfering with upstream and downstream signals for other users.

Still another object of the invention is to provide a transmission/reception integrated RF apparatus which can surely maintain isolation between a radio-frequency processing section and a connection line, even if a circuit for generating an upstream signal and a circuit for processing an intermediate-frequency signal are integrated in an LSI, and can maintain high communication quality and reliability.

Still another object of the invention is to provide a transmission/reception integrated RF apparatus which can prevent occurrence of ripple in the power supply voltage of a local oscillator for frequency-converting a downstream signal, even if an upstream signal transmission circuit is switched between an active state and an inactive state, and can maintain high reception quality of the downstream signal.

In order to achieve the above objects, there is provided a transmission/reception integrated radio-frequency apparatus comprising: an input/output terminal for inputting/outputting of a radio-frequency signal; a reception system block for receiving a first radio-frequency signal supplied to the input/output terminal, converting the first radio-frequency signal to an intermediate-frequency signal, and outputting the intermediate-frequency signal; and a transmission system block having an input terminal to which a second radio-frequency signal for transmission is supplied, and a control terminal to which a control signal for controlling an output state of the second radio-frequency signal is supplied, the transmission system block controlling the second radio-frequency signal supplied to the input terminal on the basis of the control signal and supplying the controlled second radio-frequency signal to the input/output terminal, wherein the reception system block and the transmission system block are housed in a single casing.

There is also provided a transmission/reception integrated radio-frequency apparatus comprising: an input/output terminal for inputting/outputting of a radio-frequency signal; a reception system block for processing a reception radio-frequency signal supplied to the input/output terminal; a transmission processing section including a semiconductor element for outputting a transmission radio-frequency signal to the input/output terminal; a first high-pass filter connected between the reception system block and the input/output terminal and having a first cut-off frequency (lower-limit frequency) less than a lower-limit frequency of reception frequencies; a second high-pass filter connected to an output terminal of the transmission processing section and having a second cut-off frequency (lower-limit frequency) in a frequency band lower than the first cut-off frequency; and a low-pass filter connected between the second high-pass filter and the input/output terminal and having a cut-off frequency (upper-limit frequency) in a frequency band which is higher than the second cut-off frequency and lower than the first cut-off frequency.

There is also provided a transmission/reception integrated radio-frequency apparatus comprising: an input/output terminal for inputting/outputting of a radio-frequency signal; a reception processing section for processing a radio-frequency downstream signal supplied to the input/output terminal; a transmission processing section for outputting a radio-frequency upstream signal via the input/output terminal; first and second switch means provided in series between the transmission processing section and the input/output terminal; an output time period measuring circuit for measuring an output time period of the radio-frequency upstream signal; and turn-off means for turning off the first and second switch means when the output time period measuring circuit has detected that the output time period of the radio-frequency upstream signal is greater than a predetermined time period.

There is also provided a transmission/reception integrated radio-frequency apparatus comprising: a frame-like external shield plate surrounding a periphery of a board; an input/output terminal provided on one side of the frame-like shield plate; an internal shield plate for dividing the board surrounded by the external shield plate into a first region including an area of the input/output terminal and a second region adjacent to the input/output terminal; a reception system block, formed on the first region of the board, for receiving a first radio-frequency signal supplied to the input/output terminal, converting the first radio-frequency signal to an intermediate-frequency signal, and outputting the intermediate-frequency signal; a transmission system block, formed on the second region of the board, for processing a second radio-frequency signal for transmission, and outputting the processed second radio-frequency signal to the input/output terminal; and an output terminal for deriving the output signal from the reception system block and an input terminal for supplying the second radio-frequency signal to the transmission system block, the output terminal and the input terminal being provided on a side of the external shield plate which is adjacent to the side provided with the input/output terminal and is opposed to the transmission system block.

There is also provided a transmission/reception integrated radio-frequency apparatus comprising: a first shield plate forming a rectangular outer covering with opposed first and second sides and opposed third and fourth sides, thereby surrounding a periphery of a board; an input/output terminal provided on the first side of the first shield plate at a position deviating from a center of the first side toward the third side; an internal shield plate for dividing an inside of the outer covering into a first region, a second region and a third region, the first region extending from the input/output terminal along the third and second sides toward the fourth side, the second region formed at a corner portion at which the first side adjoins the fourth side, and the third region formed at a region excluding the first region and the second region; a reception system block, formed in the first region of the board, for receiving a first radio-frequency signal supplied to the input/output terminal, converting the first radio-frequency signal to an intermediate-frequency signal, and outputting the intermediate-frequency signal; an output terminal, formed at the fourth side of the first shield plate, for deriving the output signal from the reception system block; a transmission system block, formed in the second region of the board, for processing a second radio-frequency signal for transmission, and outputting the processed second radio-frequency signal to the input/output terminal; and an input terminal, provided at the fourth side of the first shield plate, for supplying the second radio-frequency signal to the transmission system block and supplying a control signal for on/off controlling the second radio-frequency signal.

There is also provided a transmission/reception integrated radio-frequency apparatus comprising: a reception system block and a transmission system block mounted on a single board; a first power supply terminal for supplying power to a circuit in which a circuit current varies in accordance with on/off control of a transmission signal of the transmission system block; and another power supply terminal, separated from the first power supply terminal, for supplying power to a circuit different from the circuit in which the circuit current varies.

There is also provided a transmission/reception integrated radio-frequency apparatus comprising: an input/output terminal for inputting/outputting of a radio-frequency signal; a reception processing circuit for processing the radio-frequency reception signal input to the input/output terminal; a transmission processing section for outputting a radio-frequency transmission signal via the input/output terminal, the transmission processing section being able to on/off control transmission of the transmission signal; and a complement circuit for generating a complement current for suppressing a variation in circuit current in the transmission processing section, which occurs when the transmission of the transmission signal is on/off controlled.

There is also provided a radio-frequency apparatus comprising: an input/output terminal for inputting/outputting of a radio-frequency signal; a reception processing circuit for processing the radio-frequency reception signal input to the input/output terminal; and a transmission processing section for outputting a radio-frequency transmission signal via the input/output terminal, the transmission processing section being able to on/off control transmission of the transmission signal, with a variation in circuit current due to the on/off-controlled transmission being set at 10 mA or less.

There is also provided a radio-frequency apparatus comprising: a signal processing circuit for processing an input signal and outputting the processed signal; and a plurality of gain control sections connected in series to the signal processing circuit, wherein at least one of the plurality of gain control sections has first gain control means capable of controlling a gain in a first step unit, and at least another of the plurality of gain control sections has second gain control means capable of controlling a gain in a second step unit which is less than the first step unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing an entirety of a transmission/reception integrated RF apparatus according to the present invention;

FIG. 6 shows an example of circuit arrangement of the RF apparatus according to the invention;

FIG. 7 shows a specific example of an equilibrium 2-terminal circuit of the RF apparatus according to the invention;

FIG. 9A shows an example of a current complement circuit of the RF apparatus according to the invention;

FIG. 9B is a view for describing the operation of the circuit shown in FIG. 9A;

FIG. 10 shows another example of the current complement circuit of the RF apparatus according to the invention;

FIG. 11 shows still another example of the current complement circuit of the RF apparatus according to the invention; and FIG. 12 shows an example of a gain control system of the RF apparatus according to the invention.

DETAILED DESCRIPTION OF THE INVENTION

Figure 2A:
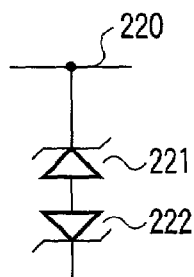
FIGS. 2A and 2B show examples of an overvoltage protection circuit.

An embodiment of the present invention will now be described with reference to the accompanying drawings.

FIG. 1 shows a whole structure of a radio-frequency (RF) apparatus to which the present invention is applied. A block indicated by a broken line 100 denotes a reception system block, and a block indicated by a broken line 200 denotes a transmission system block. A coaxial cable of a CATV network is connected to an input/output (I/O) terminal 10. The I/O terminal 10 is connected to a high-pass filter 101. The I/O terminal 10 is also connected to a low-pass filter 201 (to be described later). A downstream signal (RF reception signal) input to the I/O terminal 10 is delivered to an automatic gain control (AGC) circuit 102 via the high-pass filter 101. The gain-controlled input is then delivered to a switch 105 via an amplifier 103 and a high-pass filter 104.

An output terminal of the switch 105 is connected to a UHF band-pass filter 106 for UHF, a high VHF band-pass filter 111 for high VHF, and a low VHF band-pass filter 112 for low VHF. A band switch control signal is supplied from a timing control circuit 114 to the switch 105. An output terminal of the UHF band-pass filter 106 is connected to a frequency converter 107. An output terminal of the high VHF band-pass filter 111 and an output terminal of the low VHF band-pass filter 112 are connected to a frequency converter 113.

Outputs from the frequency converters 107 and 113 are intermediate-frequency (IF) signals and are input to an IF band-pass filter 125 using an SAW filter which passes the IF band. An output from the IF band-pass filter 125 is amplified by an amplifier 108 and gain-controlled by a programmable automatic gain control circuit 109. The gain-controlled IF signal is input to an amplifier 110 and amplified up to a predetermined output level. The amplified signal is led to terminals of an IF signal output section 122.

An AGC control circuit 121 is gain-controlled by an RF AGC signal delivered from a terminal 123.

The transmission system block 200 will now be described.

A transmission signal is input to a transmission processing section 206 via input terminals 212 and a low-pass filter (equilibrium 2-terminal circuit) 204. In addition, control signals are input to the transmission processing section 206 via input terminals 211. The transmission processing section 206 is a circuit including semiconductor devices and functions to adjust the transmission signal at an optimal level in accordance with an instruction from the center station. The transmission processing section 206 is switched between an active state and an inactive state in order to stop/start transmission of the transmission signal in accordance with the control signals supplied to the terminals 211. An output signal from the transmission processing section 206 is led to the I/O terminal 10 via an overvoltage breakdown protection circuit 203, a high-pass filter 202 and the aforementioned low-pass filter 201. The low-pass filter 201 and the high-pass filter 101 constitute a diplexer. The transmission processing section 206 includes an elapsed-time detection section which can detect that the transmission state has continued more than a necessary time period, on the basis of the signal from the control terminal 213. Based on the detection signal, the transmission processing section 206 stops the transmission.

A cut-off frequency of the high-pass filter 202 is set below a lower-limit frequency (normally 5 MHz) of the transmission frequency band. A cut-off frequency of the low-pass filter 201 is set above an upper-limit frequency (normally 42 MHz in the U.S., 50 MHz in Japan, and 65 MHz in the Europe) of the transmission frequency band. The overvoltage breakdown protection circuit 203 is not necessarily required. However, it should preferably be provided as a countermeasure to overvoltage due to lightning, etc.

The high-pass filter 202 is provided to attenuate overvoltage. An overvoltage due to indirect lightning stroke, etc. may be applied to the I/O terminal 10. Thus, it is necessary to prevent destruction of semiconductor devices of the transmission processing section 206. The relationship among the high-pass filter 202, low-pass filter 201 and reception system block 100 will now be described. The cut-off frequency of the high-pass filter 202 needs to be set below the lower-limit frequency (normally 5 MHz) of the transmission frequency band. In addition, the size of the whole circuit needs to be reduced. For these purposes, an inductor using a ferrite core is used for the high-pass filter 202. It is known, however, that the ferrite core causes non-linear distortion of its frequency characteristic, cut to harmonic components, when a high-level RF signal of up to +58 dmB is passing. For example, when an upstream signal of 40 MHz is output, a third harmonic component (120 MHz) occurs. Since the third harmonic component is within the receiving band of the reception system block 100, it interferes with a downstream signal of 120 MHz. In this invention, therefore, the low-pass filter 201 is connected at the rear stage of the high-pass filter 202. Thereby, the harmonic component is fully suppressed and prevented from affecting the downstream signal.

In the present system, in order to more surely protect the semiconductor devices in the transmission processing section 206, the overvoltage breakdown protection circuit 203 may be provided.

Figure 2B:
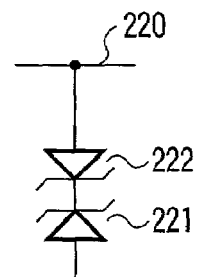

FIGS. 2A and 2B show examples of the overvoltage breakdown protection circuit 203. In the circuit shown in FIG. 2A, series-connected zener diodes 221 and 222 are connected between a signal line 220 and a ground. The anodes of the zener diodes 221 and 222 are opposed to each other. The cathode of the zener diode 221 is connected to the signal line 220, and the cathode of the zener diode 222 is grounded. Where the zener voltage of the zener diode 221 is Vz1 and the forward voltage of the zener diode 222 is VF2, the voltage of the signal line 220 is kept at Vz1+VF2 even if a positive overvoltage of Vz1+VF2 or more is applied to the signal line 220. On the other hand, where the forward voltage of the zener diode 221 is VF1 and the zener voltage of the zener diode 222 is Vz2, the voltage of the signal line 220 is kept at VF1+Vz2 even if a negative voltage of VF1+Vz2 is applied to the signal line 220.

Thus, a maximum overvoltage applied to the semiconductor devices in the transmission processing section 206 is Vz1+VF2, VF1+Vz2 at most. If Vz1 and Vz2 are optimally set, the semiconductor devices can be protected.

Where an inter-terminal capacitance of the zener diode 221, 222 is set at Cz, a capacitance of Cz/2 is provided between the signal line 220 and the ground. It is thus necessary to reduce the capacitance to a negligible level. As a method for this, it is important to choose zener diodes which have small inter-terminal capacitance. In general, the lower the zener voltage, the higher the inter-terminal capacitance of the zener diode. Therefore, it is preferable to combine them with other circuits, where necessary.

The circuit shown in FIG. 2B will now be described. This circuit operates similarly with that shown in FIG. 2A. In this circuit, the polarities of connection of the zener diodes 221 and 222 in FIG. 2A are reversed.

FIGS. 3A to 3D show other examples of the overvoltage breakdown protection circuit 203. In the circuit shown in FIG. 3A, a series circuit of a zener diode 301 and a diode 303 and a series circuit of a diode 304 and a zener diode 302 are connected in parallel between the signal line 220 and the ground. The cathodes of the zener diode 301 and diode 303 are commonly connected, and the cathodes of the diode 304 and zener diode 302 are commonly connected. The diodes 303 and 304 are switching diodes each having a lower inter-terminal capacitance and a higher reverse breakdown voltage than the zener diode 301, 302.

In general, diodes classified as switching diodes have a low inter-terminal capacitance and a high reverse breakdown voltage.

Assume that the zener voltages of the zener diodes 301 and 302 are Vz1 and Vz2, respectively, and the forward voltages of the diodes 303 and 304 are VF3 and VF4. Under the condition, even if a positive overvoltage of Vz2+VF4 or more is applied to the signal line 220, the signal line 220 is kept at Vz2+VF4. On the other hand, even if a negative overvoltage of Vz1+VF3 or more is applied to the signal line 220, the signal line 220 is kept at Vz1+VF3. This is substantially the same as the case shown in FIGS. 2A and 2B. Where the inter-terminal capacitance of the zener diode 301, 302 is set at Cz and the inter-terminal capacitance of the diode 303, 304 is set at Cs=a×Cz, a capacitance of 2×(Cz+Cs)/(Cz+Cs)=Cz×(2×a/(1+a)) is provided between the signal line 220 and the ground. This means that the capacitance value can be made less than that in the circuits of FIGS. 2A and 2B by selecting diodes with a=less than ⅓.

Figure 3A:
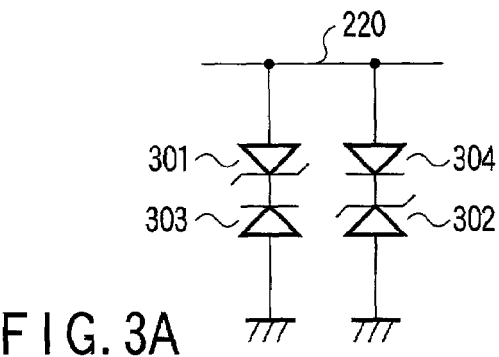
FIGS. 3A to 3D show other examples of the overvoltage protection circuit.
Figure 3B:
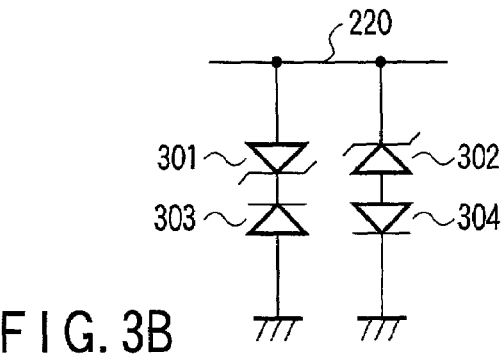
Figure 3C:
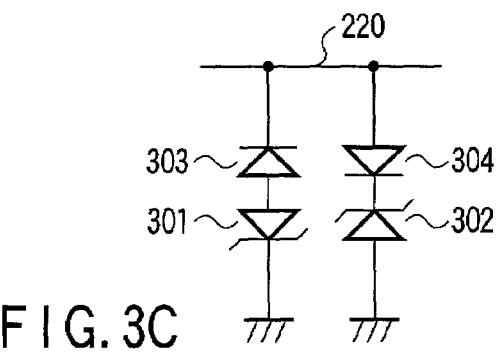
Figure 3D:
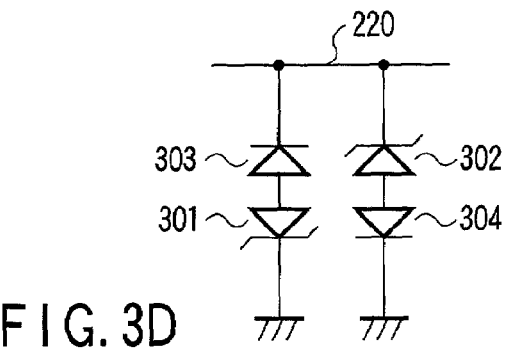

In the circuit shown in FIG. 3B, compared to the circuit of FIG. 3A, the positional relationship between the zener diode 304 and diode 302 is reversed, and their anodes are commonly connected. This circuit has the same effect as the preceding circuit. In the circuit shown in FIG. 3C, compared to the circuit of FIG. 3A, the positional relationship between the diode 303 and zener diode 301 is reversed, and their anodes are commonly connected. This circuit, too, has the same effect as the preceding circuit. In the circuit shown in FIG. 3D, compared to the circuit of FIG. 3B, the positional relationship between the zener diode 301 and diode 303 is reversed, and their anodes are commonly connected. This circuit, too, has the same effect as the preceding circuit.

Figure 4:
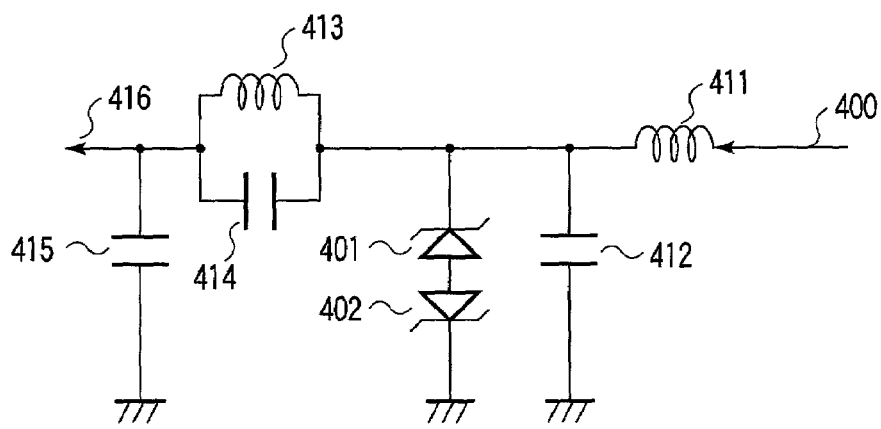
FIG. 4 shows an example of a circuit wherein the overvoltage protection circuit and a low-pass filter are integrated according to the present invention.

FIG. 4 shows an applied example of the overvoltage breakdown protection circuit according to the invention.

In this circuit, zener diodes 401 and 402 constitute an overvoltage protection circuit, and the whole circuit constitutes a low-pass filter. That is, the zener diodes 401 and 402 constitute a part of the low-pass filter. With this structure, adverse effect due to the inter-terminal capacitance of the diodes can be reduced.

Specifically, a terminal 400 is grounded via an inductor 411 and a capacitor 412. A node between the inductor 411 and the capacitor 412 is connected to a series circuit of the diodes 401 and 402 and also commonly connected to an inductor 413 and a capacitor 414 at one end. The inductor 413 and capacitor 414 at the other end are grounded via a capacitor 415 and are connected to a terminal 416.

The low-pass filter thus formed is a 75 Ω filter with a cut-off frequency of about 80 MHz. The capacitance value of the capacitor 412 is about 20 to 40 pF. On the other hand, as regards the capacitance value of the overvoltage protection circuit 401, 402, Cz/2 is 2 to 20 pF in general. Thus, if the capacitance value of the capacitor 412 is reduced by Cz/2, the inter-terminal capacitance of the overvoltage protection circuit exerts no substantial adverse effect.

Figure 5A:
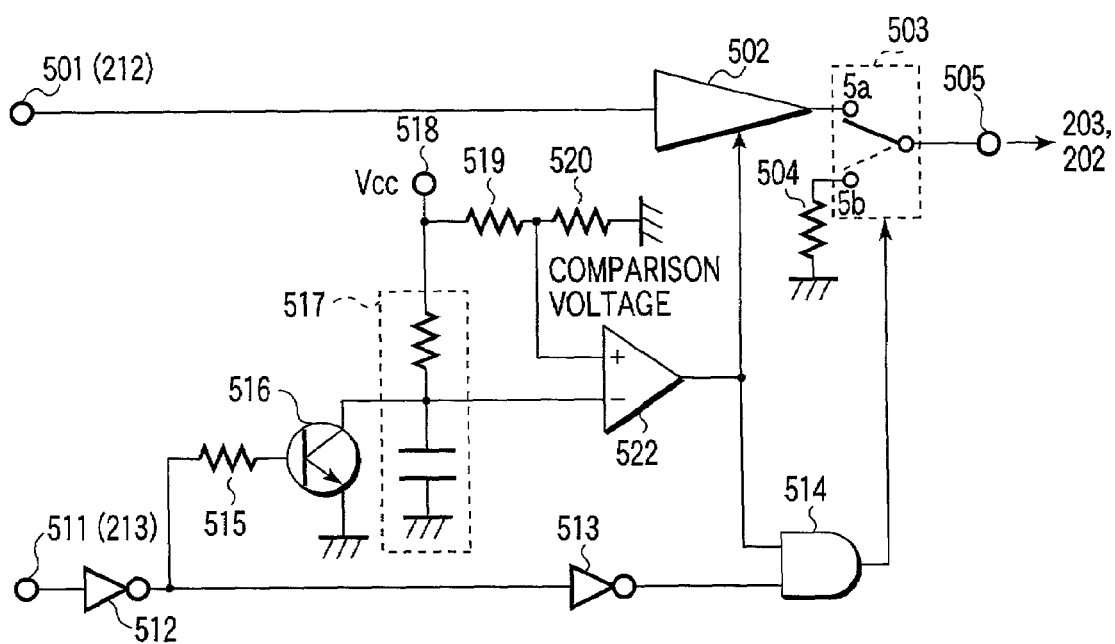
FIG. 5A shows an example of an on/off control circuit according to the invention.

FIG. 5A shows a characteristic portion of the RF apparatus of the present invention, which includes the transmission processing section 206 and peripheral components thereof. An upstream signal is input from an input terminal 501 to a variable gain control amplifier 502. The upstream signal is input to the transmission processing section 206 via the transmission signal input terminal 212 and low-pass filter 204 shown in FIG. 1. The transmission processing section 206 receives the transmission signal, controls the gain thereof, and produces a level-adjusted upstream signal. The upstream signal is gain-controlled by the variable gain control amplifier 502, as will be described below. The output terminal of the variable gain control amplifier 502 is connected to one input terminal 5a of a switch section 503. The other input terminal 5b of the switch section 503 is grounded via a resistor 504. The switch section 503 is connected to an output terminal 505. An output signal from the output terminal 505 is supplied to the high-pass filter 202 via the overvoltage protection circuit 203 shown in FIG. 1.

A control signal input terminal 511 corresponds to the control signal input terminal 213 in FIG. 1. The input terminal 511 is connected to one input terminal of an AND circuit 514 via inverters 512 and 513 in series. The output terminal of the inverter 512 is connected to a base of a transistor 516 via a resistor 515. An emitter of the transistor 516 is grounded and a collector thereof is connected to a time constant circuit 517 comprising a resistor and a capacitor. The time constant circuit 517 is connected between a power supply terminal 518 and a ground. The output terminal of the time constant circuit 517 is connected to one input terminal of a comparator 522. A node between the time constant circuit 517 and the power supply terminal 518 is grounded via resistors 519 and 520. A node between the resistors 519 and 520 is used to derive a comparison voltage. The comparison voltage is supplied to the other input terminal of the comparator 522. The output terminal of the comparator 522 is connected to the other input terminal of the AND circuit 514 and to an on/off control terminal of the amplifier 502.

The output terminal of the AND circuit 514 is connected to a control terminal of the switch section 503. The switch section 503 is operated to on/off control the upstream signal so that the upstream signal may be sent out at an assigned time period.

The operation of the above-described circuit will now be explained with reference to FIG. 5B.

Figure 5B:
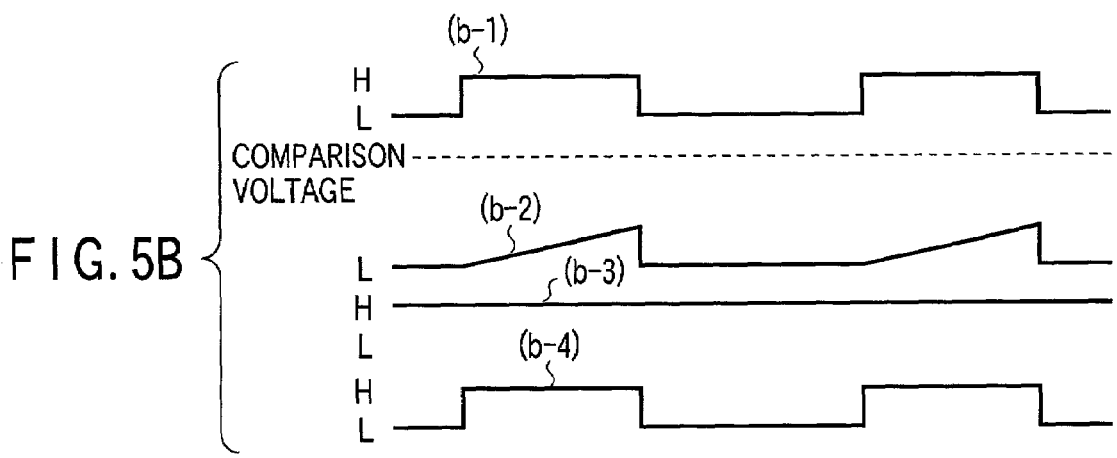
FIGS. 5B and 5C are timing charts illustrating the operation of the on/off control circuit.

An on/off control signal as indicated by (b-1) in FIG. 5B is input to the control terminal 511. When the on/off control signal is at a high level, the transistor 516 is turned off and the time constant circuit 517 is charged. Thus, the signal supplied to the one input terminal of the comparator 522 has a waveform indicated by (b-2) in FIG. 5B. A highest potential in this waveform does not exceed the comparison voltage in the normal operation, and the output of the comparator 522 is kept at the high level (see (b-3) in FIG. 5B). As a result, the signal input to the one input terminal of the AND circuit 514 has the same waveform as the control signal (b-1), and also the output of the AND circuit 514 has the same waveform as the control signal (b-1). Accordingly, the switch section 503 responds to the control signal. When the control signal is at the high level, the switch section 503 outputs the upstream signal. When the control signal is at the low level, the switch section 503 does not output the upstream signal.

Figure 5C:
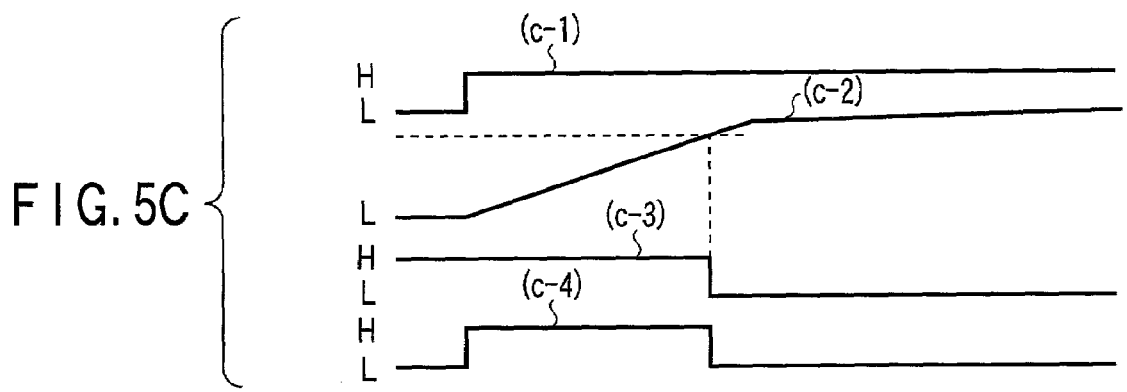

On the other hand, if the control signal remains at the high level due to some abnormality, the respective circuit components have waveforms as shown in FIG. 5C. In FIG. 5C, (c-1) indicates the control signal, and (c-2) indicates the output of the time constant circuit 517, which exceeds the comparison voltage. As a result, when the output of the time constant circuit 517 has exceeded the comparison voltage, the level of the output (c-3) of the comparator 522 changes from the high level to the low level. Thus, the output (c-4) of the AND circuit 514 is set at the low level. In addition, the low-level control signal is applied to the control terminal of the gain control amplifier 502. In this state, the switch section 503 is turned off, and the gain control amplifier 502 is rendered inoperative.

Since the upstream signal is cut off in the two stages, noise produced within the transmission processing section 206 is prevented from leaking to the outside more surely. Where the transmission processing section 206 is provided with the switch section 503 outside the IC and the amplifier 502 inside the IC, noise may leak from the output terminal of the IC unless the amplifier 502 is completely turned off. In this system, however, both are turned off, and therefore leak of noise is suppressed more surely and there is no adverse effect upon other circuits for processing the downstream signal, etc.

FIG. 6 shows another characteristic portion of the RF apparatus of the present invention.

In FIG. 6, reference numeral 61 denotes a casing module. A board 601 is provided in the module 61. The reception system block 100 and transmission system block 200 shown in FIG. 1 are mounted on the board 601. A shield plate 602 constituting an outer covering of the module 61 surrounds an outer peripheral edge of the board 601. The shield plate 602 is disposed perpendicular to the surface of the board so as to surround the board 601. The shape of the board 601 in plan is substantially rectangular.

Reference numeral 603 denotes a coaxial cable attachment portion which is projected outward from a short side portion 6a of the shield plate 602. The RF signal (downstream signal) is input to, and the upstream signal is output from, the coaxial cable attachment portion 603. A first partition plate (shield plate) 604 is disposed inside the shield plate 602 at a short side portion 6b, which is located opposite to the coaxial cable attachment portion 603. The first shield plate 604 is arranged to define a distance W1 between itself and the short side portion 6b. A second partition plate (shield plate) 605 is disposed inside the shield plate 602 in parallel to a long side portion 6c. A distance W2 is defined between the second shield plate 605 and the long side portion 6c. One end of the shield plate 605 abuts on the inner surface of the short side portion 6a, and the other end thereof abuts on the shield plate 604 substantially at right angles.

A third partition plate (shield plate) 606 is disposed between the inner surface of the long side portion 6c of shield plate 602 and the inner surface of the shield plate 605. The third shield plate 606 is located at a distance W3 from the short side portion 6a of shield plate 602.

A distance W4 is defined between an inner surface of a long side portion 6d of the shield plate 602 and the shield plate 605. A partition plate (shield plate) 607 having a length equal to the distance W4 is disposed between the inner surface of the long side portion 6d of shield plate 602 and the shield plate 605.

As a result, regions A, B, C, D and E are defined by the plural shield plates on the board 601. The diplexer is disposed in the region A. The reception system block is arranged in the regions B and C. In particular, the circuit section for treating intermediate frequencies is disposed in the region C. The transmission system block is disposed in the region D. A DC-DC converter 300 is disposed in the region E.

With the above arrangement, the transmission processing section 206 can process the control signal and transmission signal, as required, immediately after they have been input to the terminals 211 and 213 of the module. The external circuit, terminals and transmission system block can be arranged with shortest distance. It is possible to alleviate adverse effect of unnecessary radiation of the signal input to the transmission system block, which acts on the other circuits. It is also possible to alleviate adverse effect of unnecessary radiation of the upstream signal and control signal input to the upstream signal transmission processing section 206, which acts on the other circuits.

Moreover, by virtue of the distances defined by the shield plates 607 and 604, it is possible to alleviate adverse effect of unnecessary radiation of the upstream signal and control signal input to the transmission system block, which acts on the output signal (in particular, the IF signal output from the terminal 122) of the reception system block. On the other hand, it is possible to alleviate adverse effect of unnecessary radiation of the output signal of the reception system block, which acts on the transmission signal input to the transmission system block.

A DC-DC converter 300 is disposed in the region defined by the shield plates 607 and 604. Thereby, unnecessary radiation produced by the DC-DC converter 300 is shut off by the shield plates 607, 604 and 605 and the long side portion 6d of the shield plate 602. Thus, it is possible to prevent such radiation from adversely affecting the peripheral circuits, and to effectively use the region between the shield plates 607 and 604.

In this invention, one or two output terminals 122 for taking out the IF signal from the reception system block and input terminals 212 for delivering the control signals to the transmission system block are provided at predetermined intervals on the long side portion 6d of the shield plate 602. The distance between the output terminal 122 and input terminal 121 is 30 mm or more and 60 mm or less.

Specifically, each of distances L1, L2, L3 and L4 between the terminals is 30 mm or more and 60 mm or less. By setting the distance at 30 mm or more, it becomes possible to alleviate adverse effect of unnecessary radiation of the transmission signal and control signal input to the transmission system block, which acts on the received signal obtained from the reception system block. On the other hand, it is possible to alleviate adverse effect of unnecessary radiation of the received signal obtained from the reception system block, which acts on the transmission signal and control signal input to the transmission system block.

Since the distance is set at 60 mm or less, there is no need to unnecessarily extend connection lines which are led to the module 61 from the circuit for generating the transmission signal, which is to be input to the module 61, and the circuit for processing reception signal obtained from the reception system block. Therefore, adverse effect of mutual induction among connection lines can be reduced.

The invention has the following feature, too.

The equilibrium 2-terminal input circuit 204 is an equilibrium 2-terminal low-pass filter which does not a ground circuit immediately after the control signal is input. Thus, immediately after the transmission signal is input to the module 61, an unnecessary component superimposed on the transmission signal can be suppressed. Since the low-pass filter has no ground circuit, an unnecessary component removed from the transmission signal does not flow into the ground circuit of the module 61, and adverse effect on the module can be reduced.

Where an unnecessary signal due to unnecessary radiation from the circuit outside the module has been superimposed on the transmission signal input to the input terminal 212 in equilibrium, or where a clock signal of in-phase component has been superimposed in the transmission signal generating circuit (not shown), the in-phase component can be canceled according to characteristics of the equilibrium 2-terminal circuit. Thus, an interfering component superimposed on the transmission signal can be reduced.

FIG. 7 shows an example of the equilibrium 2-terminal circuit (low-pass filter) 204. In this circuit, a capacitor 703 is connected between terminals 701 and 702. The terminal 701 is connected to one electrode of a capacitor 706 via a parallel circuit of an inductor 704 and a capacitor 705. The terminal 702 is connected to the other electrode of the capacitor 706 via a parallel circuit of a capacitor 707 and an inductor 708. The one electrode of the capacitor 706 is connected to one electrode of a capacitor 711 via a parallel circuit of an inductor 709 and a capacitor 710. The other electrode of the capacitor 706 is connected to the other electrode of the capacitor 711 via a parallel circuit of a capacitor 712 and an inductor 713. Both ends of the capacitor 711 are connected to both ends of a primary winding of a transformer 714. A secondary winding of the transformer 714 is connected to an output terminal 715.

The RF apparatus of this invention also has the following feature.

Figure 8A:
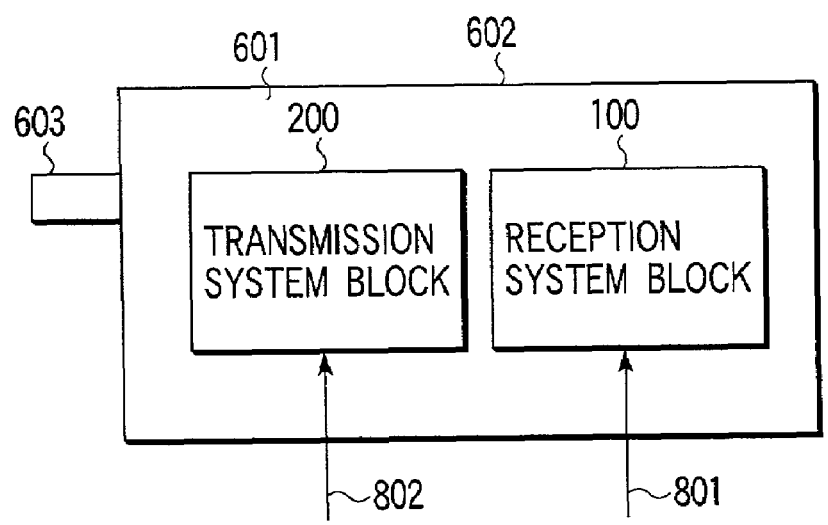
FIGS. 8A to 8C show examples of power voltage supply terminals of the RF apparatus according to the invention.

FIG. 8A shows the circuit mounted on the board 601, which is separated from the standpoint of power supply. The RF apparatus is provided with different power supply terminals 801 and 802 which correspond to the reception system block 100 for processing the downstream signal and the transmission system block 200 for outputting the upstream signal. Thereby, the power supply voltages for the respective blocks are surely isolated. Thus, even if the transmission processing section 206 is on/off controlled in order to send out the upstream signal and the circuit current varies, the power to the local oscillator for, in particular, frequency conversion of the downstream signal is not adversely affected. Therefore, the quality of the reception signal can be maintained.

Figure 8B:
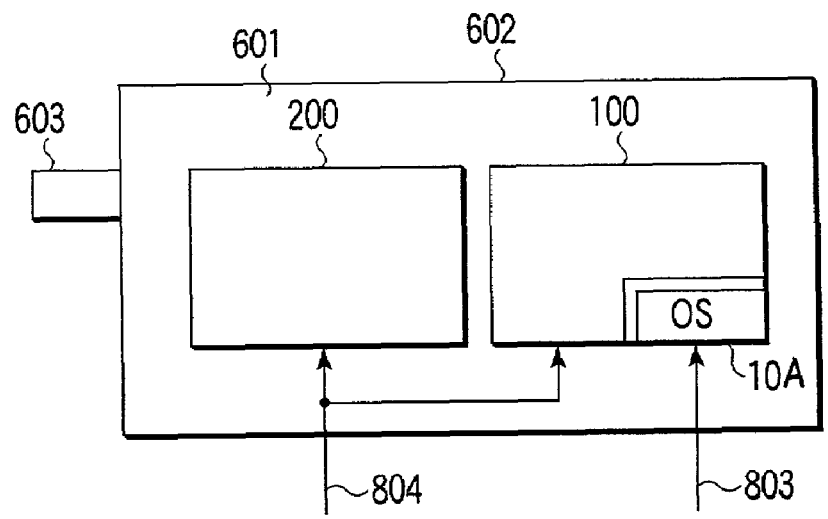

In an example shown in FIG. 8B, an independent power supply terminal 803 is provided for the local oscillator 10A (corresponding to a phase lock loop 115) in the reception system block 100. Another power terminal 804 is provided to supply power to the other circuit components of the reception system block 100 and the transmission system block 200. With this structure, too, even if the transmission processing section 206 is on/off controlled in order to send out the upstream signal and the circuit current varies, the power to the local oscillator for, in particular, frequency conversion of the downstream signal is not adversely affected.

Figure 8C:
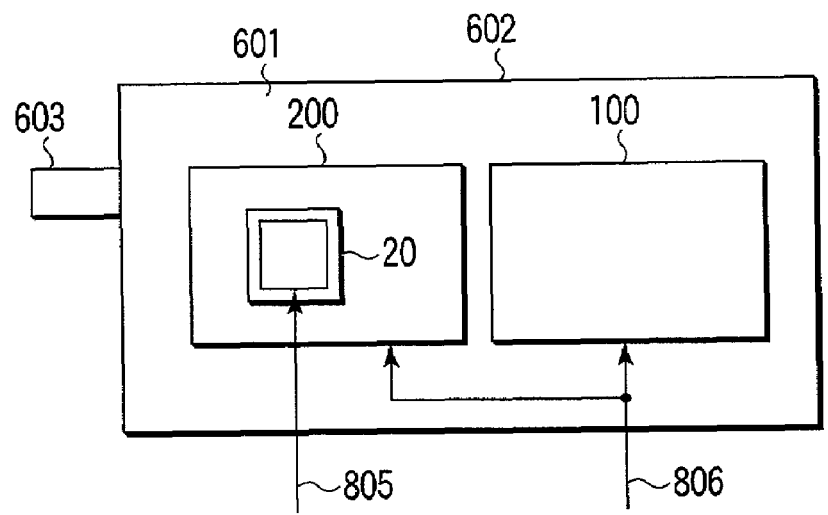

In an example shown in FIG. 8C, an independent power supply terminal 805 is provided for a current variable circuit 20 wherein a circuit current may vary, in particular, when the transmission processing section 206 in the transmission system block 200 is on/off controlled to transmit the upstream signal. Another power supply terminal 806 is provided to supply power to the circuits in the transmission system block excluding the current variable circuit 20 and to the reception system block 100. In this case, too, even if the transmission processing section 206 is on/off controlled in order to send out the upstream signal and the circuit current varies in the current variable circuit 20, the other circuits are not adversely affected.

The RF apparatus has the following feature, too.

FIG. 9A shows means for suppressing a variation in circuit current, which occurs when the switch section 503 (see FIG. 5) is on/off controlled in the transmission processing section 206. In FIGS. 9A and 9B, the output from the amplifier 502 is delivered to the output terminal 505 via the switch section 503.

The switch section 503 comprises switching elements using semiconductor devices. Reference numeral 901 denotes a power supply section which is supplied with power from a terminal 903. The switch section 503 is provided with a control terminal section 902. The control signal from the AND circuit 514 is delivered to the control terminal section 902. The power supply section 901 is provided with a current supplement circuit 910 which is connected to the power supply terminal 903. Specifically, the terminal 903 is connected to a collector of a transistor 911. An emitter of the transistor 911 is grounded via a resistor 912 and is connected to a base of the transistor 911 via a resistor 913. The base of the transistor 911 is connected to the control terminal section 902 via a resistor 915. The base of the transistor 911 is grounded via a capacitor 914.

The operation of this switch section will now be described.

If the control signal from the AND circuit 514 is at the low level, the switch section 503 is turned on and current is consumed. On the other hand, if the control signal from the AND circuit 514 is at the high level, the switch section 503 is turned off and no current is consumed. In this case, however, the transistor 911 is turned on and current is consumed. By substantially equalizing the current consumption of the current supplement circuit 910 to that of the switch section 503, a variation in current, as viewed from the terminal 903, is decreased. For example, if a difference in current consumption between the current supplement circuit 910 and switch section 503 is set at 10 mA or less, the variation in current as viewed from the terminal 903 can be set at 10 mA or less, irrespective of the on/off operation of the switch section 503.

FIG. 9B shows a consumed current of the switch section 503, a consumed current of the current supplement circuit 910 and a current variation as viewed from the terminal 930, in the case where the current level at the terminal 902 has changed between the high level and low level. It is understood, from this, that the current variation as viewed from the terminal 903 is equal to a difference between $I\alpha$ and $I\beta$.

FIG. 10 shows another embodiment. In this embodiment, a switch section 503a which is identical to the switch section 503 is provided. An output terminal of the switch section 503 is connected to an input terminal of the switch section 503a, and an output terminal of the switch section 503a is grounded via a terminal resistor 921. The control signal from the AND circuit 514 is input to a control terminal section 902a via an inverter 920. The terminal 903 supplied with power supply voltage is connected to a power supply section 901a.

Thereby, the switches 503 and 503a are complementarily on/off controlled by the control signal. If one of them is turned on, the other is turned off. The consumed current is also varied complementarily. As a result, even if the switch section 503 is turned on/off, the consumed current as viewed from the terminal 903 varies very slightly, and the variation amount can be reduced to 10 mA or less.

FIG. 11 shows still another embodiment. In this embodiment, a switch element, with which the terminal 505 is grounded via a resistor 930 at the time of turnoff, is used as the switch section 503. A circuit or component, which is switched by an FET, in particular, GaAsFET, is suitable for this switch element, and the variation amount can be reduced to 1 mA or less.

FIG. 12 shows another feature of the RF apparatus according to the invention.

FIG. 12 shows, in particular, a characteristic portion of the invention shown in FIG. 1. In the present invention, the automatic gain control circuit 102 for controlling the level of the RF signal comprises attenuators 4a, 4b, 4c, . . . , which have various attenuation amounts. One of the attenuators is selectively connected by the AGC control circuit 121. The RF signal is frequency-converted by the frequency converter 107 or 113 and then gain-controlled by the programmable automatic gain control circuit 109. In this way, in the RF apparatus of the invention, the RF gain control section and IF gain control section are controlled by digital control data. In the RF gain control section, the attenuation amounts of the attenuators are precisely adjusted in steps of about 5 dB. On the other hand, in the IF gain control section, gain control can be performed in finer steps.

As a result, the gain control information of the RF signal and IF signal is digital data. Thus, the input level of the signal input from the CATV network can be understood with exact AGC information.

As has been described above, according to the present invention, an overvoltage due to indirect lightning stroke applied to the I/O terminal is attenuated by the high-pass filter 202 and the semiconductor elements in the transmission processing section 206 can be protected. Even if the ferrite core is used for the high-pass filter 202 and an unnecessary harmonic component is produced, the unnecessary harmonic component is attenuated by the low-pass filter 201 and does not leak to the reception system block or the coaxial cable side. Thus, the reliability of the entire system can be enhanced.

With the addition of the overvoltage protection circuit 203, the protection performance is further increased. If the overvoltage protection circuits having the structures as shown in FIGS. 2A, 2B and 3A–3D are adopted, the protection function can be performed against overvoltages of both negative and positive polarities. In addition, the inter-terminal capacitance (i.e. the capacitance between the signal line and the ground) detrimental to the RF circuit can be reduced. By using zener diodes and ordinary diodes having less capacitance in combination, the inter-terminal capacitance is further decreased.

Using the arrangement of the circuit blocks of the present invention, i.e. the arrangement wherein the transmission system block is disposed immediately inside the long side portion 6d of shield plate 602, the transmission signal is prevented from entering, as undesired radiation, the circuits other than the transmission system block. Since the transmission system block and the IF signal output section are spaced apart by the shield plates 604 and 607, the control signal for controlling the transmission system block is prevented from adversely affecting the IF signal of the reception system. On the other hand, the IF signal is prevented from adversely affecting the transmission signal of the transmission system block.

Since the external terminals connected to the module are spaced apart, as shown in FIG. 6, interference of undesired radiations between the terminal 212 for inputting the transmission signal and the terminal 122 for deriving the IF signal can be alleviated. Moreover, it is possible to alleviate mutual adverse effect of unnecessary radiations from the transmission signal connection line and the reception signal connection line on the printed board (board 601).

Since the DC-DC converter 300 is disposed as shown in FIG. 6, it is possible to alleviate adverse effect of unnecessary radiation produced from the DC-DC converter 300, which acts on peripheral signals such as the transmission signal and IF signal.

Since the equilibrium 2-input circuit (204) is used, an interfering component superimposed on the transmission signal can be reduced. Since the equilibrium 2-input circuit having no ground circuit is used at the input side (FIG. 7), an unnecessary component superimposed on the transmission signal does not leak to the ground circuit, and the operational performance of the apparatus can be enhanced.

Furthermore, since the power supply modes as shown in FIGS. 8A to 8C are used, even if a variation occurs in current in the on/off controlled circuit of the transmission system block, the performance of the frequency converter is not degraded. The operation of the local oscillator used for frequency conversion is stable.

The following advantages can be obtained by adopting the gain control method as illustrated in FIG. 12. Inexpensive fixed attenuators with wide band characteristics can be easily obtained. Since the attenuators have little non-linear distortion characteristics, they are suitable for the gain control section requiring wide band characteristics and low distortion characteristics. Gain control in small steps is difficult only with the switching of fixed attenuators. In this invention, the programmable gain controller capable of performing gain control in small steps is combined with the gain control section having fixed attenuators, thereby realizing the RF apparatus capable of achieving high-performance gain control in small steps. In the case of the reception system, the system control section can detect with precision the input level on the basis of the gain control information. In the case of the transmission system, numerical control of the output signal level can be performed.

The present invention is not limited to the above-described embodiments. Needless to say, the embodiments may be selectively combined to realize the RF apparatus.

As has been described above, the present invention can provide a transmission/reception integrated radio-frequency apparatus having high reliability and high communication quality in a cable modem.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A transmission/reception integrated radio-frequency apparatus comprising,
    an input/output terminal for inputting/outputting of a radio-frequency signal;
    a reception system block for processing a reception radio-frequency signal supplied to the input/output terminal;
    a transmission processing section including a semiconductor element for outputting a transmission radio-frequency signal to the input/output terminal;
    a first high-pass filter connected between the reception system block and the input/output terminal and having a first cut-off frequency (lower-limit frequency) less than a lower-limit frequency of reception frequencies;
    a second high-pass filter connected to an output terminal of the transmission processing section and having a second cut-off frequency (lower-limit frequency) in a frequency band lower than said first cut-off frequency;
    a low-pass filter connected between the second high-pass filter and the input/output terminal and having a cut-off frequency (upper-limit frequency) in a frequency band which is higher than said second cut-off frequency and tower than said first cut-off frequency; and
    an overvoltage breakdown protection circuit connected between the output terminal of the transmission processing section and the second high-pass filter.

2. A transmission/reception integrated radio-frequency apparatus according to claim 1, wherein said overvoltage breakdown protection circuit comprises two zener diodes connected in series between a signal line and a ground, and electrodes of the two zener diodes, which have the same polarities (cathodes or anodes), are connected to each other.

3. A transmission/reception integrated radio-frequency apparatus according to claim 1, wherein said overvoltage breakdown protection circuit comprises a first series circuit and a second series circuit, each of the first and second series circuits comprising a zener diode and a diode having a higher reverse breakdown voltage than the zener diode, with their electrodes of the same polarities (cathodes or anodes) being connected to each other, and
    the first and second series circuits are connected in parallel between a signal line and a ground such that the polarity of the zener diode of the first series circuit is opposite to the polarity of the zener diode of the second series circuit, and the polarity of the diode of the first series circuit is opposite to the polarity of the diode of the second series circuit.

* * * * *